(12) United States Patent
Fruechtel

(10) Patent No.: US 6,175,825 B1
(45) Date of Patent: Jan. 16, 2001

(54) METHOD FOR DEBITING SHIPPING SERVICES

(75) Inventor: Ingrid Fruechtel, Berlin (DE)

(73) Assignee: Francotyp-Postalia AG & Co., Birkenwerder (DE)

(*) Notice: Under 35 U.S.C. 154(b), the term of this patent shall be extended for 0 days.

(21) Appl. No.: 09/106,491

(22) Filed: Jun. 29, 1998

(30) Foreign Application Priority Data

Jul. 29, 1997 (DE) .............................................. 197 33 605

(51) Int. Cl.$^7$ .................................................. G07B 17/00
(52) U.S. Cl. .............................. 705/404; 705/30; 705/410
(58) Field of Search .............................. 705/30, 400, 404, 705/410

(56) References Cited

U.S. PATENT DOCUMENTS

| | | | |
|---|---|---|---|
| 4,024,380 | 5/1977 | Gunn | 235/61.9 A |
| 4,376,299 | 3/1983 | Rivest | 364/900 |
| 4,447,890 | * 5/1984 | Duwel et al. | 705/410 |
| 4,495,581 | * 1/1985 | Piccione | 705/402 |
| 4,511,793 | 4/1985 | Racanelli | 235/375 |
| 4,649,266 | * 3/1987 | Eckert | 235/432 |
| 4,713,761 | * 12/1987 | Sharpe et al. | 705/30 |
| 4,812,994 | * 3/1989 | Taylor et al. | 705/410 |
| 4,837,701 | * 6/1989 | Sansone et al. | 705/404 |

(List continued on next page.)

FOREIGN PATENT DOCUMENTS

| | | |
|---|---|---|
| 2201051 | * 7/1972 | (DE) . |
| 31 26 786 | 4/1982 | (DE) . |
| 3644230 | * 7/1987 | (DE) . |
| 36 24 116 | 1/1988 | (DE) . |
| 3903718 | * 8/1989 | (DE) . |
| 3808616 | * 9/1989 | (DE) . |
| 4034292 | * 4/1992 | (DE) . |
| 3126785 | * 7/1992 | (DE) . |
| 3644231 | * 5/1998 | (DE) . |
| 0747846 | * 5/1996 | (EP) . |
| 2730575 | * 4/1999 | (FR) . |

OTHER PUBLICATIONS

Quinn: "What's new for airfreight shippers? (service offerings)(includes related article)"; Traffic Management, Jan. 1994, v33, n1, p. 57.*

* cited by examiner

Primary Examiner—Edward R. Cosimano
(74) Attorney, Agent, or Firm—Schiff Hardin & Waite

(57) ABSTRACT

In a method for debiting shipping services on the basis of the respective transport service fee schedules of carriers, accounting operations of the services of various carriers are standardized and simplified by undertaking a central accounting, and the debiting of the services ensues individually or summed. A user program is loaded into a modified postage meter machine that has a printer and a telecommunication unit, at least one service fee table of a carrier being selectable therefrom. The weight or some other physical quantity of a shipment is entered the modified postage meter machine, and a service value is calculated therein in conjunction with the selected shipping parameters. The printer device of the modified postage meter machine prints out an identity ticket that contains the shipping parameters, at least including the shipping fee for the shipment. The information characterizing the shipment are intermediately stored in the modified postage meter machine and the implemented value identification of the shipment is transmitted via a telecommunication connection to a remote data center, either individually or summed. The data received in the data center are acquired, compiled and separately accounted for for each carrier with an accounting program and an invoice is prepared at the data center and is communicated to the consignor for payment. All steps involving storage or handling of funds or monetary credit associated with the shipping service take place exclusively at the data center.

20 Claims, 6 Drawing Sheets

U.S. PATENT DOCUMENTS

| | | | |
|---|---|---|---|
| 4,855,920 | 8/1989 | Sansone et al. | 364/464.02 |
| 4,872,705 * | 10/1989 | Hartfeil | 283/67 |
| 4,900,904 * | 2/1990 | Wright et al. | 235/381 |
| 4,907,161 | 3/1990 | Sansone et al. | 364/464.02 |
| 5,040,132 | 8/1991 | Schuricht et al. | 364/523 |
| 5,111,030 | 5/1992 | Brasington et al. | 235/375 |
| 5,117,364 * | 5/1992 | Barns-Slavin et al. | 705/402 |
| 5,200,903 * | 4/1993 | Gilham | 705/408 |
| 5,222,018 * | 6/1993 | Sharpe et al. | 705/30 |
| 5,233,657 | 8/1993 | Günther | 380/23 |
| 5,319,562 * | 6/1994 | Whitehouse | 705/403 |
| 5,388,049 * | 2/1995 | Sansone et al. | 705/406 |
| 5,586,036 * | 12/1996 | Pintsov | 705/408 |
| 5,586,037 * | 12/1996 | Gil et al. | 705/407 |
| 5,717,596 | 2/1998 | Bernard et al. | 364/464.02 |
| 5,826,247 * | 10/1998 | Pintsov et al. | 705/404 |
| 5,923,406 * | 7/1999 | Brasington et al. | 355/40 |
| 5,978,781 * | 11/1999 | Sansone | 705/408 |
| 6,010,156 * | 1/2000 | Block | 281/2 |
| 6,032,138 * | 2/2000 | McFiggans et al. | 705/410 |
| 6,064,994 * | 5/2000 | Kubatzki et al. | 705/410 |

METHOD FOR DEBITING SHIPPING SERVICES

BACKGROUND OF THE INVENTION

1. Field of the Invention

The present invention is directed to a method for debiting shipping services of various carriers, preferably for package mail, on the basis of the respective transport service fee schedules of the carriers.

2. Description of the Prior Art

In modern offices, package shipping ensues at a personal computer, referred to as a PC below. A package shipping system known as Euklas is commercially available from Francotyp-Postalia AG & Co. This system attends to the shipping handling of, for example, letters, printed matter, goods shipments, small packages, postal matter and packages. A carrier, for example the mails, USPS, UPS, FedEx, DHL, DPD and/or other shippers accept the shipment and conduct it to a destination address. On the basis of valid shipping service fee schedules of the carriers, the system calculates the shipping fee for the shipping services, produces a freight label that contains the remuneration and other necessary shipping information and prints out shipping papers in the usual way.

The monetary settlement of the shipping service with the consignor is done by the carrier. To that end, the carrier bills the consignor the cost incurred for the services. The payment by the consignor ensues without pre-payment.

This known system employs a PC with a data bank in which a number of transport service fee schedules for various carriers is stored. The PC is connected to at least one scale in order to receive weight data from the scale and to calculate the payment value on the basis of the transport service fee schedules in accord with the selected shipping options within the framework of the system use.

In another version the shipment weight is separately determined and is entered via an unit together with other shipping data such as, for example, the postal area code, format particulars and supplementary freight data, and the payment value is calculated therefrom. The consignor determines supplementary freight data or, respectively, shipping options such as, for example, recipient address, type of shipment, shipping form and carrier by corresponding inputs via the PC keyboard or by selecting from a menu offering. Shipping papers and freight labels for the shipment are produced with printer devices that are connected to the PC.

The pick-up service of the respective carrier individually reviews the scope of the shipment on the basis of the freight papers that have been produced and confirms the correctness of the calculated payment values for the received shipment by estimation or by re-measurement. The processing data collected by the package shipping system assure the review of the scope of the shipment and enable a package and event search given shipping errors. Beyond this, shipping data can be compiled for monthly and annual statistics, separately for each carrier. A specific embodiment of an apparatus for shipment handling is set forth in German OS 3808616.

A package shipping system of the described type has an acquisition cost and maintenance costs associated therewith which usually cause the system not be suitable on a cost/benefit basis for customers having low mail volume.

On the other hand, shipping processes are becoming more and more complicated since the number of private carriers in the field of shipping services is constantly increasing, and the spectrum of services is also experiencing broad expansion. A problem even for relatively low-volume shipping customers thus is that the carriers each render their own invoices and each has unique billing routines and associated paperwork, so that a customer cannot implement a standardized payment procedure.

On the other hand, it is conventional to utilize a postage meter machine for debiting payments for letter mail. The postage meter machine can be equipped with a control unit, a memory, an input unit, a modem or other data reception means, an input/output interface and a printer. Due to the coupling to, among other things, a scale and a tape dispenser, technical means are present in order to also make package mail ready for shipping in addition to letter mail. The shipping particulars applicable to a franking tape can be determined, calculated and printed out. The producible stamp (franking) imprint meets the requirements of the Deutsche Post AG for letter mail. Postage meter machines are subject to approval by the national postal authorities. Only those machines that assure an accurate administration, reloading and debiting of monetary amounts and which have a secure printer means receive approval.

The transfer of credits into the postage meter machine already ensues, at least in part, from a remote data center via a telecommunication means. The measures for securing money requests and accounting operations for preventing tampering or unauthorized usage require a high technical outlay for checking the use authorization and the identification of the postage meter machine. All known postage meter machines have in common the fact that they only execute a payment imprint when sufficient credit is loaded in the postage meter machine. This payment regime, referred to as pre-payment, is unsuitable for the handling of package shipments since the payments for this type of shipment are orders of magnitude higher than the shipment handling for letters and similar mailings. Pre-financing therefore cannot be expected from the consignor. This unreasonability will be even more is drastically intensified as further private freight concerns penetrate the field of package shipping in the future, which would necessitate that separate monetary credits be established for them.

Solutions are known such as, for example, that disclosed in German OS 2201051 for employing a postal apparatus for calculating postal fees for package shipping. The apparatus provided for self-service mailing employs two printer devices for printing the fees and the address data as well as the package identification for special services. An imprint is only generated when money amounts were paid to a sufficient extent. Handling by automatic unit is very time-consuming for the customer since the customer itself must get its package mail to be sent to the mail counter. This handling by automatic unit is also not lucrative in view of the cash expediting. Increased outlay occurs for the carrier due to the immediate payment administration. The communication of a postage meter machine with a remote data processing system for central debiting of postage fees is disclosed, for example, in German OS 3126785 and German OS 3126786. The securing of this connection between postage meter machine and data center is a necessary approval prerequisite of the system by the applicable postal authorities in order to preclude the manipulability of the amounts of money to be accounted for. The machine-oriented measures therefor are extremely cost-intensive.

German OS 3644231 proposes a secured accounting unit similar to a postage meter machine into which funds are offered from a remote data center that is in communication with a remote resetting center for accounting for the funds. Postage reloading events are collected and stored in this remote resetting center. The transfer of postage credits ensues given simultaneous debiting of the transferred credit value from the customer's account, as disclosed, for example, in German OS 3644230. The retention of the flexibility of package shipping cannot be implemented for this accounting principle based on a pre-payment. In particular, it is problematical that every carrier establishes its own data center that sets up a communication connection to the customer equipment and transfers credits. It is also disadvantageous for the customer that several accounts would have to be set up given a number of carriers, the account coverage would have to be assured and the various accounting procedures would have to be monitored. Required security measures for assuring protection against manipulation make corresponding devices more expensive to acquire.

French Patent 2730575 discloses a franking, accounting and invoicing method for postal articles and services that employs an approved data processing system. The data are edited in the data processing system and forwarded through a postage meter machine. The data processing system communicates a user program that comprises a customer account. At the end of an action, the customer can determine whether the action is to be paid immediately or whether a billing should ensue at the end of a previously determined time span.

This method allows the review of the coincidence of the register contents of the postage meter machine and the register contents of the data processing system. It is disadvantageous that the customer must maintain adequate credit in the postage meter machine and must additionally maintain a customer account in the data processing system.

German OS 3624116 discloses a method for franking mailings with fees that are selectable in advance in terms of value. The fees printed by a printer are automatically communicated to an acquisition stage at least temporarily connected to the printer via a telephone connection and are registered at the acquisition stage. This solution is also based on enabling printing of the franking imprint only when sufficient credit is present. The security measures make devices similar to postage meter machines too expensive for the employment as printer of non-monetary characters.

German OS 4034292 discloses a method with which terminal equipment present at the user, for example a telefax device, can be used for the implementation of fee imprints, and the debiting of the postage fees ensues in a data center.

A secured postage box that receives credits and a print enable signal from the data center via the communication connection is allocated to the terminal equipment for fee accounting for individual frankings. This system still has the disadvantage that the customer can obtain credit only by pre-payment. Moreover, high costs arise for the respective connections with the data center. Further, the use of a number of carriers is difficult to realize technically since, in particular, the creation of the pre-conditions for the availability of current, respective fee schedule tables of a number of carriers necessitates high technical outlay given corresponding terminal equipment.

This outlay, however, is already realized in modern postage meter machines. As a result of their intended use, the calculation of the postage fee for a mailing is possible from fee schedule tables and other data that can be entered via the keyboard. The pre-conditions are also established for loading fee schedule tables from a data center or by means of data carriers for various services into the memories of the postage meter machine or to update stored contents. As disclosed in European Application 747846, the most favorable vendor can be determined from a number of carriers. What is thus particularly achieved is that shipping actions can be handled in a previously standard way by more efficient methods.

German OS 3903718 discloses a postage fee accounting system for which a personal computer is provided in order to produce extensive accounting reports via a connected printer. For monitoring credit of a department-related postage meter machine use, data are transmitted to a chip card, particularly relating to the register contents of the security account. The fetchable information can be displayed and printed out in various formats. This solution can also be applied to other delivery services that require a franking imprint but has all of the disadvantages that have already been recited for a pre-payment. Even if chip cards were allocated for individual carriers, a consignor would have to acquire a corresponding number of credits for the execution of the frankings. This debiting with pre-financing is uneconomical, particularly for consignors with low shipment volume.

SUMMARY OF THE INVENTION

A goal of the invention is to standardize and simplify the accounting actions for services of various carriers, so that shippers having low mail volume can also make use of such services.

The invention has the object of developing a method for a shipment debiting system, wherein shipments are respectively only provided with an identity ticket, and wherein a central accounting is enabled individually or aggregated, depending on the user's option, and wherein a monitoring of the actions by the customer is enabled.

This object is inventively achieved by generating a stamp imprint or a stamp-like imprint, for shipment transport services, with a printer device, referred to below as an identity ticket, that at least shows the calculated shipping costs according to fee schedule tables of public and/or private carriers. A telecommunication link can be made to enable a connection setup to a remote data center.

The method can be conducted in a device that has a printer, or a connection for an external printer, and which is equipped with adequate memory capacity and which communicates with a remote data center, preferably via a modem device.

The device for implementing the method for fee calculation for shipping services and for print output of the information related to the service is equipped with an input unit, calculating software, with means for driving the digital print technology, a memory arrangement in which, for example, fee schedule tables are maintained, an internal modem or modem terminal and with a connection for peripheral equipment, for example, a weighing apparatus.

The debiting of monetary values does not ensue in the device itself.

A user program is loaded in the device and is activated, with at least the fee schedule tables of one carrier being selectable therefrom.

The shipment to be sent is inventively weighed or is evaluated with respect to at least one physical quantity of the shipment, such as size.

The identified shipment parameters are entered into the device with other shipment data, including at least destination data and carrier data. A service value is calculated for the entered data on the basis of the valid fee schedule table of a selected carrier. At least the calculated service value, which corresponds to the value-identifying shipping fee, is printed onto an identity ticket with the printer, this being applied to the shipment as a way-bill.

The memory arrangement can include a buffer memory in which all print operations that relate to the identity ticket are intermediately stored.

The device is connected to a remote data center with the communication link for transmitting implemented value identifications. The transmitted data are acquired in the data center, where the data are compiled and separately debited for each carrier by a debiting program. The debiting result is communicated at least to the consignor by the data center.

The method enables the employment of a device wherein security measures for protecting financial means against manipulation can be omitted, since no funds need to be stored, administered or posted in the machine. The method can be economically employed particularly because no credit account of any kind must be accessed in the device or in the data center given the accounting procedures that are implemented.

The accounting of the shipping services ensues only by the data center on the basis of use and information data communicated from the stationary device at the consignor. In addition to the advantages from the centrally implemented accounting procedures, an extensive standardization and simplification of the accountings procedures are achieved.

DESCRIPTION OF THE PREFERRED EMBODIMENTS

Figure 1:
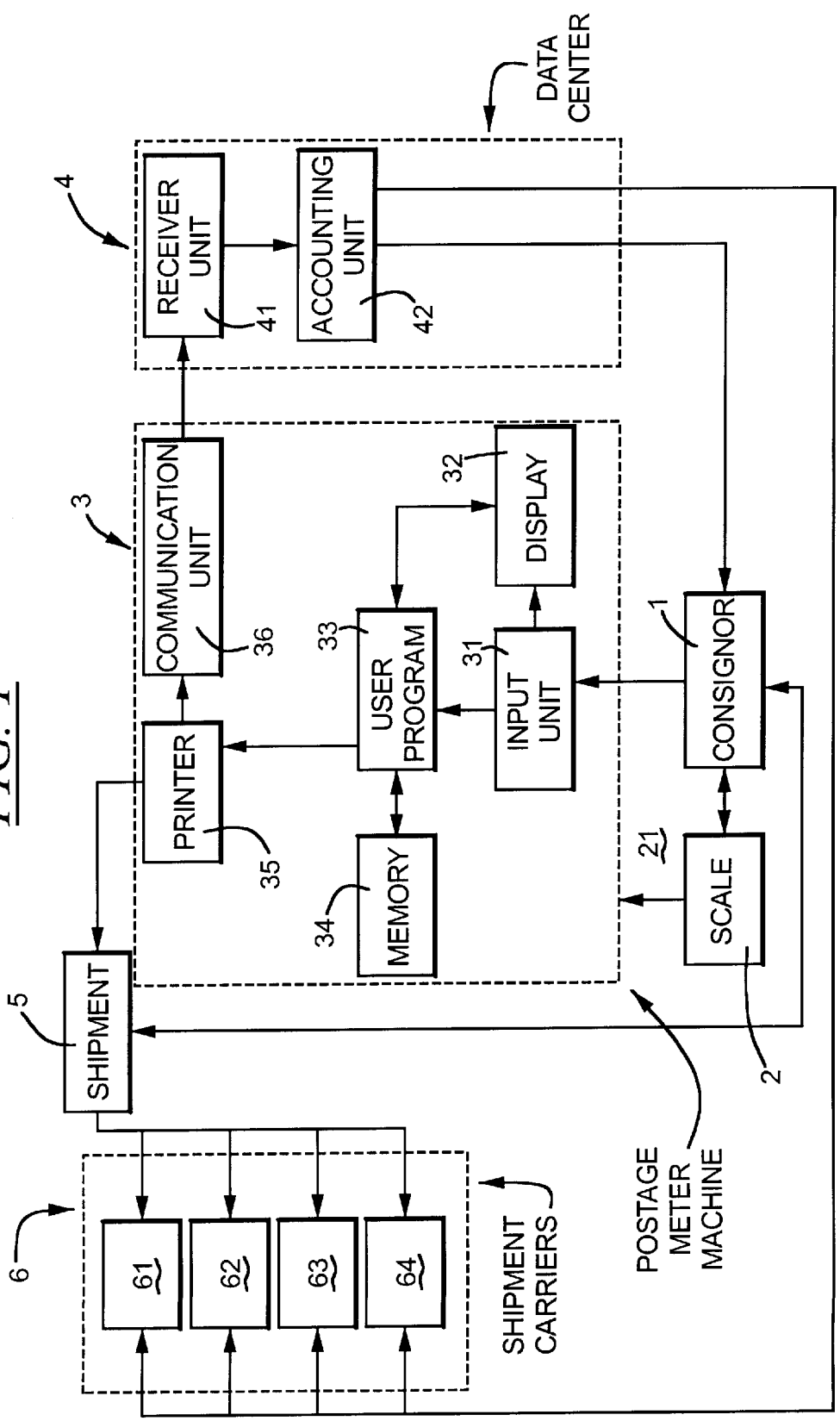
FIG. 1 is a block diagram of a shipping method using a modified postage meter machine that is coupled to a scale, in accordance with the invention.

As shown in FIG. 1, a scale 2 and a modified postage meter machine 3, referred to below as postage meter machine, are installed at the location of the consignor 1. The postage meter machine 3 is connected to a remote data center 4 via a telecommunication unit 36, preferably a modem. A modified postage meter machine 3 is advantageously employed for the fee calculation for shipping services. The means for the implementation of the fee calculation and for the print output of the information related to the service are already present in a conventional postage meter machine, or can be additionally implemented in a simple way. Compared to the standard applications for franking letter mail, the modified postage meter machine 3 differs in that no debiting of monetary values ensues in the machine. The application of the invention, however, is not limited to this embodiment.

The consignor 1 determines the weight for every shipment 5 with the scale 2. The postage meter machine 3 calculates the service value for a shipping service defined by the consignor 1 in conformity with stored transport service fee schedules on the basis of the input weight data and other shipping information. The postage meter machine 3 prints all data and information, but at least the calculated service value, on an identity ticket that is applied to the shipment.

As noted above, the postage meter machine 3 is equipped with a telecommunication unit 36 for setting up a connection to a remote data center 4. Every print operation of the postage meter machine 3 wherein an identity ticket is generated is communicated to the data center 4 via this connection.

The data relating to the identity ticket are acquired in the data center and are compiled and accounted for separately for each of the carriers 61 through 64 by an accounting program. After the reckoning procedure, a settlement in the form of an invoice is communicated to the consignor 1 separately for each carrier 61 through 64 that has printed an identity ticket. The costs for the shipping service listed on the invoice or invoices are to be paid by the consignor 1.

The postage meter machine 3 is additionally equipped with a specific user program 33 for shipping services. Given activation of the user program 33, at least the fee schedule table of one carrier 6 can be selected. A memory 34 is allocated to the user program 33.

The memory 34 is divided into a number of memory areas (not shown in FIG. 1). Among other things, transport service fee schedule tables of various carriers 61 through 64, forms for identity tickets corresponding to the respective requirements of the carriers 61 through 64, advertizing slogans, consignee and consignor address data are stored here. Further, memory capacities are provided in the postage meter machine 3 that allow for intermediate storage of the implemented print operations before the transmission to the data center 4 and/or for registering printing-related data for statistical purposes. For example, the calculation of service values is possible by accessing stored transport service fee schedules of various carriers 61 through 64 and their spectra of services. With respect to the forms, the memory 34 contains at least the frame of an identity ticket.

With the assistance of the user program 33, an identity ticket that is composed of variable and fixed data can be printed out according to the user entries. Contents and frame of the identity ticket are matched to the requirements of the carriers 61 through 64.

The postage meter machine 3 further contains an input unit 31 for entering shipment parameters such as, for example, the weight and the dimensions of the shipment 5, additional information and/or for the activation of selectable options of the user program 33 by the consignor 1. A display 32 supplies input requirements (prompts) necessary for the use of the postage meter machine 3, shows alternative selection options, and shows the calculated service values.

A printer 35 integrated in the postage meter machine 3 produces an identity ticket, similar to a stamp (franking) imprint, that includes the amount of the shipping service value and further parameters of the shipping service according to the selected user program 33. The identity ticket is preferably printed on a self-adhesive label that is glued to the shipment 5 after the printout.

The version of a postage meter machine 3 modified for shipping shipments 5 differs from standard postage meter machines approved by the postal authorities in that no financial data are administered, loaded and posted in the postage meter machine 3. With reference to the shipping costs for a shipment 5, the printer device 35 only prints the value quantity of the shipping service in readable form, preferably as a numerical number or in combination with a machine-readable character sequence. Since no funds are contained in the machine, the intended use of a conventional postage meter machine is accomplished but with the omission of security measures or other security standards for preventing fraudulent actions. Consequently, a meter/base separation that is standard for postage meter machines is not required for the modified postage meter machine 3. There is likewise no necessity of securing the data transmission link to the data center 4, the reception and processing equipment in the data center 4 or the imprint of the identity ticket with special identifiers.

The special nature of the postage meter machine 3 also is due to the fact that costs or fee values are only calculated, without a debiting of the service ensuing within the modified postage meter machine 3. The shipping services are paid by the consignor 1 only in the framework of a post-payment, i.e, upon the rendering of an invoice. Complicated software implementations for locking and unlocking the printer devices 35 dependent on the supply of monetary credit are not required.

The connection setup of the postage meter machine 3 with the data center 4 via the telecommunication unit 36 ensues under pre-set conditions in conformity with the executive sequences for automatic data transmission to the data center 4 that are programmed in the postage meter machine 3 in a known way.

Several transmission strategies are possible.

Thus, the transmission of shipment data to the data center 4 can ensue automatically for each shipment 5 or following a confirmation by the consignor 1. At the data center 4, the received shipment data are transmitted from a reception unit 41 to an accounting unit 42. The accounting for the performed services ensues for the first time at the data center 4 with the transmitted shipment data, essentially the particulars that identify the consignor 1, determine the carrier 6 and relate to the service value, being registered and allocated separately according to carriers and billed to the consignor 1.

A particular advantage is the use at the data center 4 of accounting procedures which are to be negotiated with the carriers 61 through 64 that likewise automatically sequence but which allow an optimization of the connection times with the data center 4. Thus, a transmission of the shipping actions intermediately stored in the postage meter machine 3 to the data center 4 is possible within a fixed time limit, for example weekly, bi-weekly or monthly.

Alternatively, an item limit number of identity tickets can be preset within the postage meter machine 3, with a data transmission to the data center 4 being automatically triggered when this limit is reached or exceeded. An automatic data transmission dependent on the upward transgression of a summed calculation quantity in the buffer memory of the postage meter machine 3 is likewise possible for a specific number of (but at least for two) shipment items. If the data transmission cycles are limited by a set quantity, then it is advantageous to inform the consignor 1 of the automatic transmission of the data, such as by causing the printer device 35 to remain locked until the consignor 1 actuates an enable key of the input unit 31. For example, this can be a key that triggers and/or terminates a manual activation of the data transmission to the data center 4. Advantageously, automatic data transmission sequences should ensue at times during which the postage meter machine 3 is not employed for the calculation of service fees and for producing identity tickets. In particular, the nighttime hours are available for such data transmission since the charges for the connection setup with the data center 4 are also less expensive during that time.

The existing data center 4 of a postage meter machine manufacturer can be expanded such that shipment actions are decoupled and subtracted from tele-postage recrediting processes that are standard for letter mail frankings. The inclusion of the debiting of shipment costs according to the method described herein, however, must not impair the security for the functions of the tele-postage center involving the employment of monetary data.

Advantageously, a modem is employed in a known way for the transmission of data in the opposite direction as well, from the data center 4 to the postage meter machine 3. The transmission of accounting results, and the loading of valid transport fee schedule tables as well as the updating thereof, are possible.

Corresponding confirmations of the data reception can be registered together with the date and time of day in the postage meter machine 3 in a specific memory not referenced in detail, dedicated for statistical purposes and for monitoring by the consignor 1 and for the carrier 6. The memory contents can then be fetched at any time and displayed on the display 32.

The user program 33 loaded in the postage meter machine 3 controls all operations for the processing of shipments 5, including user prompting. Operating modes, optional selection possibilities and further information are thus offered via the display 32. The user dialogue begins with the activation of the user program 33 from which at least the service fee table of a carrier 6 (carriers 61 through 64 in FIG. 1) is selectable. Frequently repeatable operations can be triggered by allocated function keys of the input means 31 or by key sequences.

The consignor 1 undertakes a weight determination for the shipment 5 with a scale 2 that accompanies the postage meter machine 3. The identified weight value is entered into the postage meter machine 3. The input ensues either manually by the consignor 1 via the input unit 31 of the postage meter machine 3 or automatically via a signal line 21 that connects the scale 2 to the postage meter machine 3. Additional information such as, for example, the dimensions of the shipment 5 can be entered with the input unit 31 if the freight regulations of the carriers 61 through 64 require this information. Moreover, the entry of further shipping parameters such as, for example, the shipment type, the shipping form and the destination also ensues via the input unit 31. These selection parameters and others are preferably optionally selectable from a menu structure and can be activated by input keys or key sequences. The user program 33 can embody routines which allow the consignor 1 to view the service fee schedules of various carriers 61 through 64 and to select the most beneficial service vendor on the basis of the desired shipping conditions. European Application 747864 discloses in detail how the most beneficial service vendor can be determined by accessing valid service fee tables for at least two carriers.

The calculation of the service value for the transport service ensues in the postage meter machine 3. After entry of the shipping particulars required for the calculation, but at least upon the entry or existing storage of a current service fee table, and the entry of the destination and the selected carrier 6, the postage meter machine 3 is activated for making this calculation. The fee charges can be designed to be customer-specific. A prompt for the consignor 1 to initiate printing of the displayed calculation value can be provided, but can be optionally bypassed particularly given a number of identical shipments 5. Likewise, the authorized use of the postage meter machine 3, or only of the printer 35, can be protected by a password.

As already explained, the identity ticket printed out by the printer 35 includes the required shipping parameters for a shipping service offered by a carrier, and at least includes the calculated service value of the shipment 5. Self-adhesive paper strips or tickets preferably serve as print carriers, these being successively supplied to the printer 35 by a delivery means from a stack of such print carriers (not shown in FIG. 1). Alternatively, self-adhesive labels can be peeled from a tape roll after the printing and glued to the shipment 5. The shipment 5 provided with the identity ticket is handed over to the transport service of the carrier 6 for shipping.

The data printed on the identity tickets, which are required for billing the service, are transmitted by telecommunication unit 36 to the remote data center 4 for each implemented print operation of the postage meter machine 3. As noted above, the data center 4 has a data reception unit 41 that compiles the communicated information such as, for example, the machine identification number, the implemented printing operations, carrier particulars and shipping identifiers. The billing (invoicing) ensues in the accounting unit 42 of the data center 4 on the basis of the data about the individual shipping operations received by the reception unit 41. Each consignor 1 receives a separate invoice for each of the carriers G1 through G4 which that consignor 1 has used within the accounting period.

An invoice corresponding to the service use is prepared for the debited shipping operations in the data center, this being communicated to the consignor 1 for payment. The invoice contains detailed particulars about the service performed by the carriers 61 through 64 and totals the corresponding remuneration to be paid. The transmittal of the invoice ensues in a known way either electronically with terminal equipment present at the consignor 1, for example a telefax device, or by mail. The transmittal of the invoice by letter mail has the advantage that payment orders, preferably already issued for the firm's bank, can be sent to the consignor 1. Simultaneously with the invoicing of the consignor 1, the carrier 6 that performed the service also receives a duplicate of the invoice. This facilitates operations monitoring and allows for further possibilities in the payment procedure. If, for example, the carriers 6 have collection authorizations from the consignor 1, the carrier is authorized to get cost-covering monetary amounts by bank collection. The firm bank of the consignor 1 can also be the recipient of the original invoice. To this end, additional identification features of the consignor 1 are applied to the invoice in order to enable a check of the data important to the bank. When the invoicing has been approved, the transfer of the invoiced amount to the carrier account indicated by the consignor 1 ensues. The standard bank protection procedures are thereby followed.

Since the data centers of the postage meter machine manufacturers can be used, favorable shipping conditions likewise derive for conveying packages abroad. A standardization of the billing procedures is achieved by centralization of the service billing by machine production of the invoices. Reviewing invoices is simplified for the consignor 1 as well as for the carrier 6, and, in particular, the invoicing is simplified for the carrier. A further advantage arises for the carrier because the carrier can forego the preparation of way-bills or corresponding accompanying papers.

Figure 2:
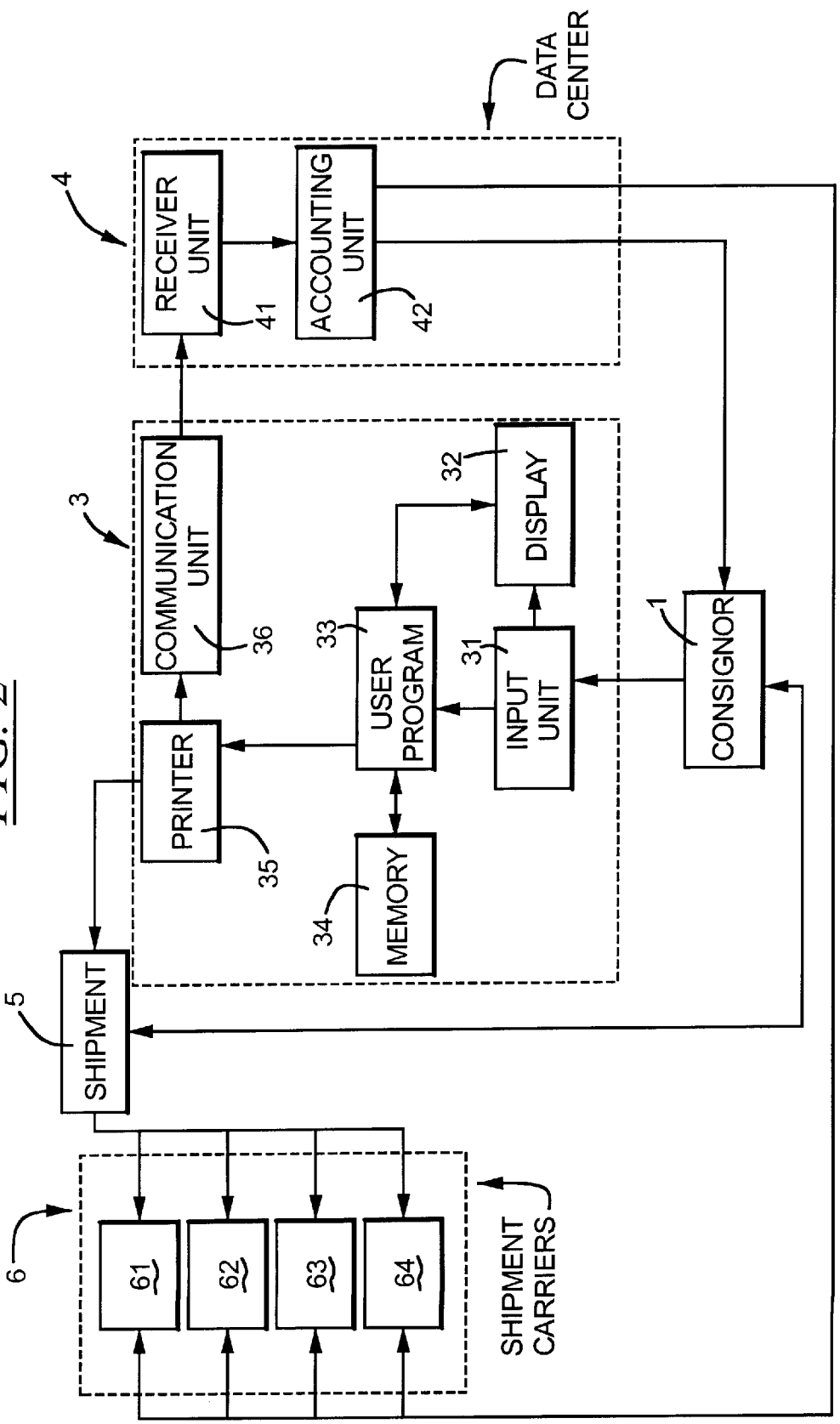
FIG. 2 is a block diagram of a shipping method using a modified postage meter machine without scale in accordance with the invention.

As shown in FIG. 2, a scale is not needed if the service cost for a shipment 5 is not to be determined by weighing; rather, the carrier 6 also performs the shipping service on the basis of other measured and/or estimated quantities in the calculation of the service values. This is dependent on the fee schedule offerings of the carriers 61 through 64 that accept a value determination for a shipping service for a shipment that is not based on weight determination. Instead of the cost determination by weighing, other physical shipment parameters can be determined at the location of the consignor 1, which, individually or combined with one another, allow the calculation of the value quantity of the shipping service according to the inventive method. For example, the estimated weight, the determined volume size or the piece number for shipments 5 can represent an adequate criterion for entry into the postage meter machine 3 and for service calculation. This embodiment is not limited to the aforementioned shipment quantities. All reviewable particulars that characterize a shipment can be employed or the combination of these physical quantities.

Figure 3:
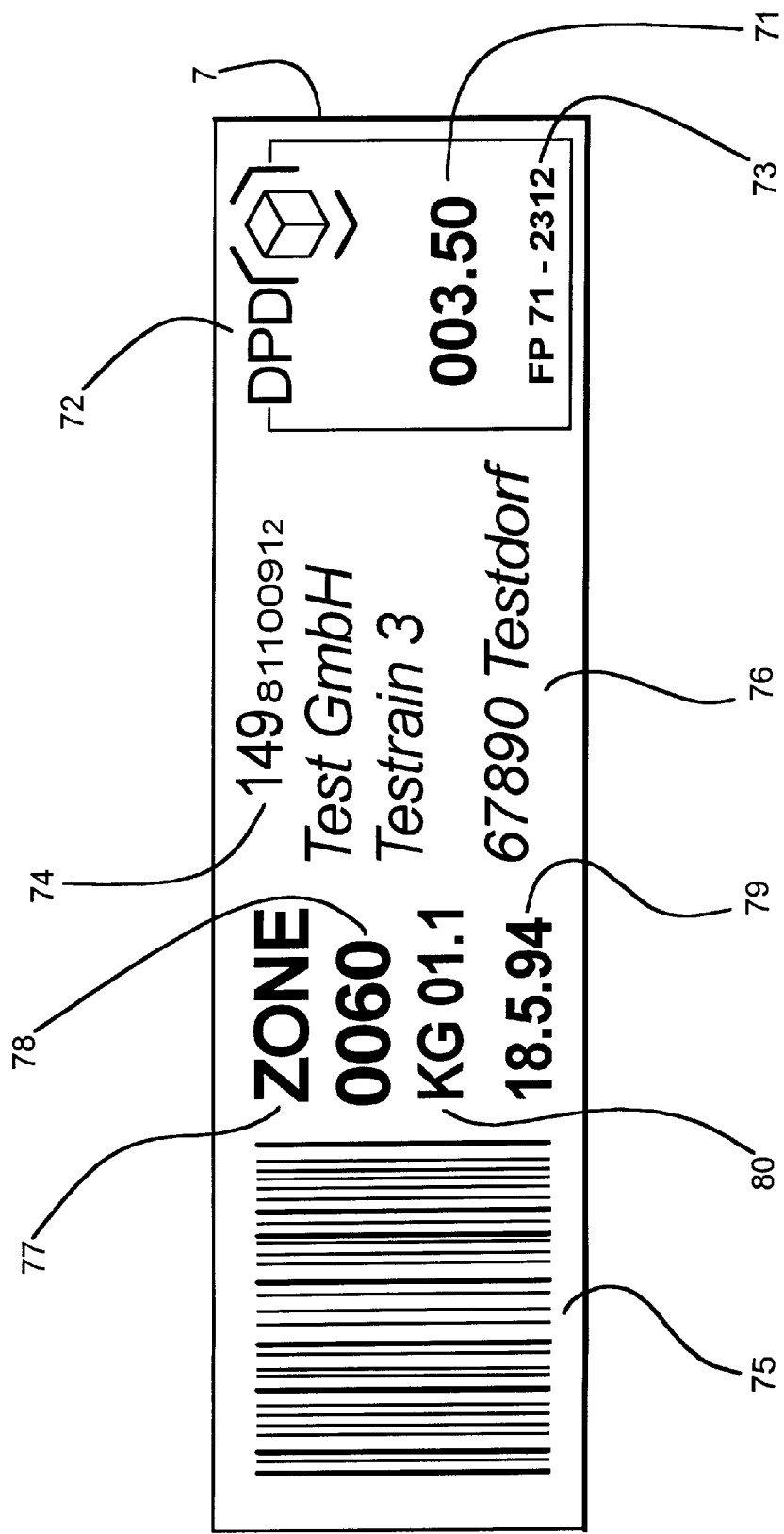
FIG. 3 is a specimen of an identity ticket produced by the system of FIG. 1 or FIG. 2.

In a further embodiment a modified stamp imprint can be produced by the modified postage meter machine 3 that clearly differs from a conventional postal value imprint and that can be unambiguously verified as an identity ticket of a carrier 6. FIG. 3 shows a generated identity ticket 7 similar to a franking tape. The printed remuneration 71 corresponds to the service value calculated by the modified postage meter machine for the goods to be shipped on the basis of the service schedule of the respective carrier. Specific data about the carrier 72 and the customer number 73, which coincides with the postage meter machine number in FIG. 3, are printed together in a predetermined frame. Each shipment receives an allocated shipment number 74 that allows an operations search given shipping errors. Alternatively or additionally, the shipment number can be incorporated in a bar code 75, possible with other data. The representation of the consignor data 76, particularly the zone data 77 represented by the zone number 78, is but one example of possible imprint information. Thus, the shipment preparation date 79 and the weight particular 80 may also incorporated, as shown in FIG. 3.

A particular advantage is that the modified postage meter machine 3 can print advertizing messages on the identity ticket.

Figure 4:
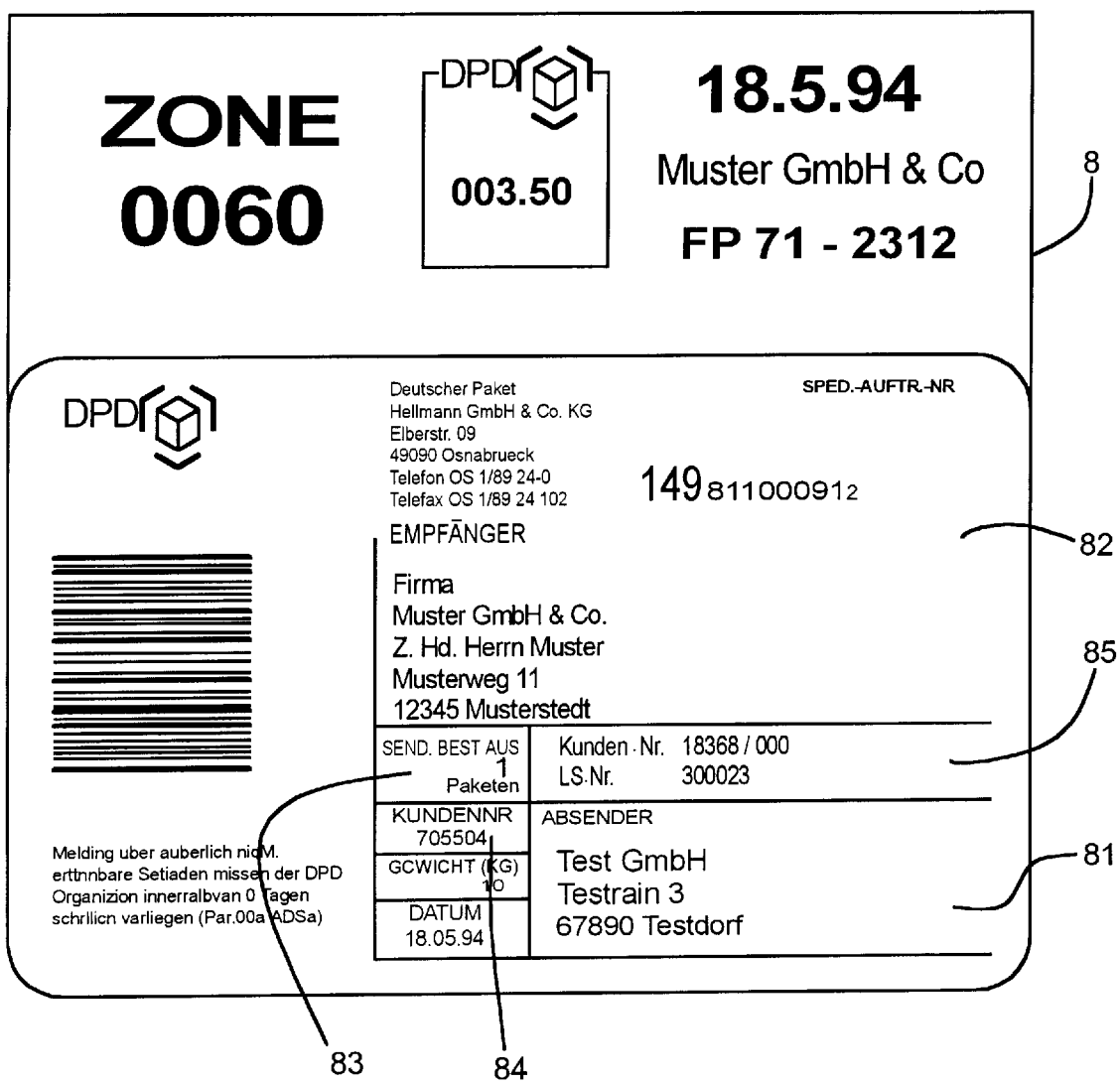
FIG. 4 is specimen of an expanded identity ticket produced by the system of FIG. 1 or FIG. 2.

FIG. 4 shows an identity ticket 8 without routing data. Additionally, the stamp imprint contains not only the particulars of the consignor 81 but also contains the shipping address 82 already integrated in the stamp. One particular refers to the identification of the shipment 83. In the present case, the shipment is composed of one parcel item. Customer numbers 84 and 85 are printed on the identity ticket for the consignor and consignee. A printed bar code verifies the shipping address. The consignor 1 maintains address data of its customers in a customer memory (not shown). These address data are fetchable in a menu-prompted fashion and are displayable on the display 32. For producing the identity ticket, at least one frame for the acceptance of variable and fixed data is stored in the modified postage meter machine 3. The employment of a single form for an identity ticket is not compulsory. The memory 34 of the modified postage meter machine 3 is designed such that further form tickets can be fetched for various types of shipment and are available to be printed out.

The outer frame that, for example, corresponds to the contour of an identity ticket is divided into individual information blocks. Contents that are automatically written into these blocks and generated by input via a keyboard, for example weight and format, existing system data such as the date as well as package ticket number and the service value, as well as from stored datafiles, the recipient address, postal zip code, zone number, customer number, etc. It is also decisive that the shipment type and the carrier designation be visible on the package ticket. Further, routing particulars (not shown in FIG. 4) can be applied to identity tickets, for example as a bar code.

Figure 5:
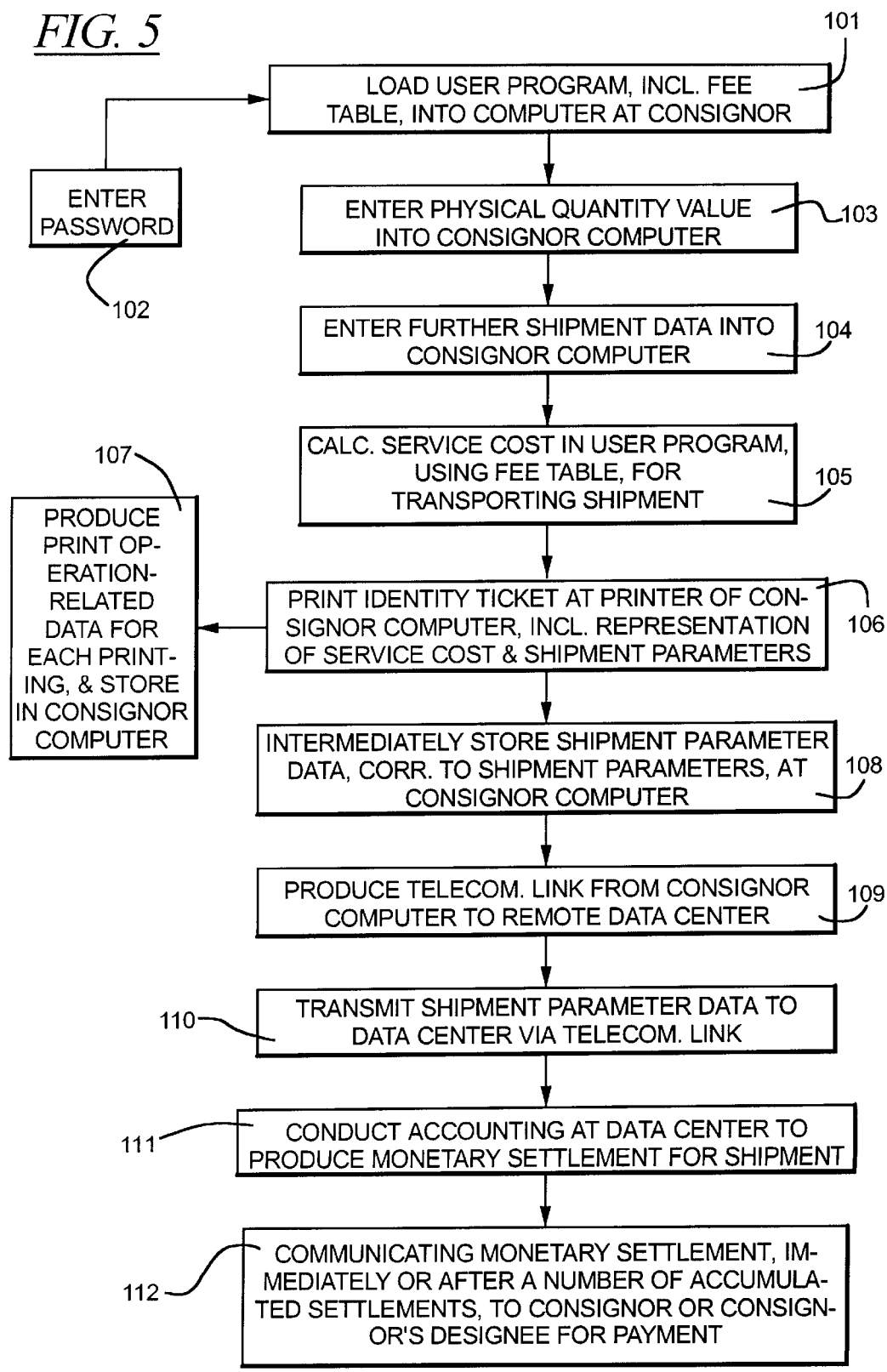
FIG. 5 is a flowchart showing basic steps of the shipping method in accordance with the invention.

FIG. 5 is a flowchart showing the basic steps of the inventive shipping method. In step 101, a user program, including a fee table for a shipment carrier, is loaded into a computer at the consignor. If desired, either loading, or subsequent use, of the program can ensue only after a valid password has been entered, as shown in step 102.

Thereafter, the consignor enters a physical quantity value into the computer in step 103, and may also enter further shipment data into the computer in step 104. Based on the entered information, and using the loaded fee table, a service cost for transporting the shipment is calculated in the consignor computer in step 105. In step 106, a blank identity ticket is supplied to a printer at the consignor computer, and a printed identity ticket is produced at the printer in a print operation. The printer prints on the identity ticket a printed representation at least of the service cost, an identifier for the computerized vice, information relating to the print operation, the destination and the carrier for the shipment. The printed identity ticket is affixed to the shipment. If desired, the print operation-related data for each printing can be intermediately stored at the consignor computer, as indicated in step 107. Additionally, the shipment parameter data corresponding to the shipment parameters are intermediately stored at the consignor computer in step 108.

At an appropriate time, a telecommunication link is produced from the consignor computer to a remote data center in step 109, and in step 110, the shipment parameter data are transmitted via the telecommunication link from the consignor computer to the data center. In step 111, an accounting is conducted at the data center to produce a monetary settlement for the shipment. In step 112, the monetary settlement, either immediately after a number of accumulated settlements, is communicated to the consignor or to the consignor's designee (such as, for example, the consignor's bank) for payment.

Figure 6:
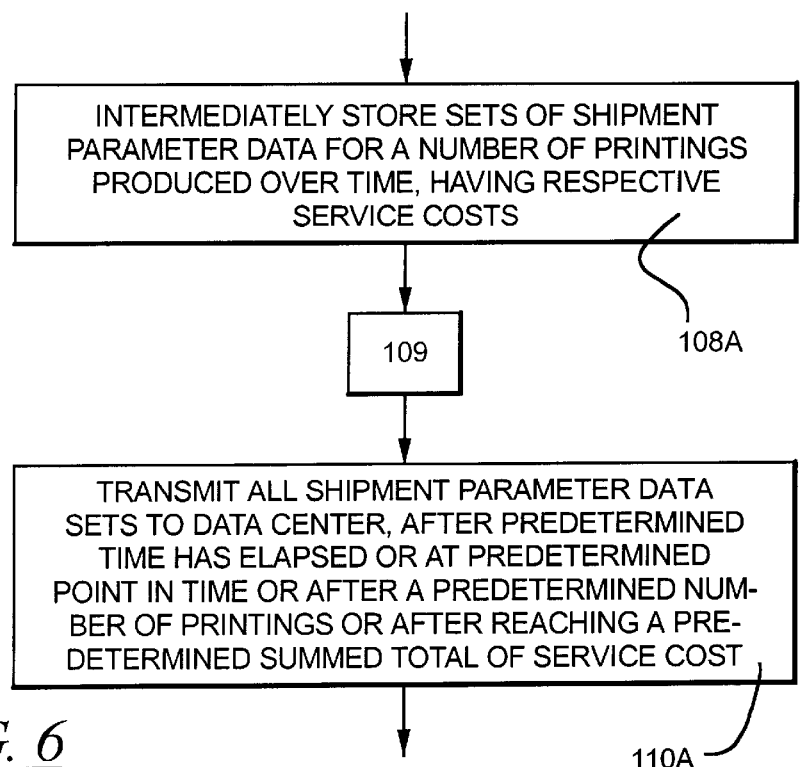
FIG. 6 is a flowchart showing a first variation of the method shown in FIG. 5.

As shown in FIG. 6, step 108 can be modified as step 108A so that sets of shipment parameter data for a number of printings produced over time, having respective service costs, are intermediately stored. Step 109 then proceeds as before. In a modified version of step 110, as step 110A, all of the shipment parameter datasets are transmitted to the data center, and this occurs either after a predetermined period of time has elapsed, or at a predetermined point in time or after a predetermined number of printings has occurred or after reaching a predetermined summed total of the service costs.

Figure 7:
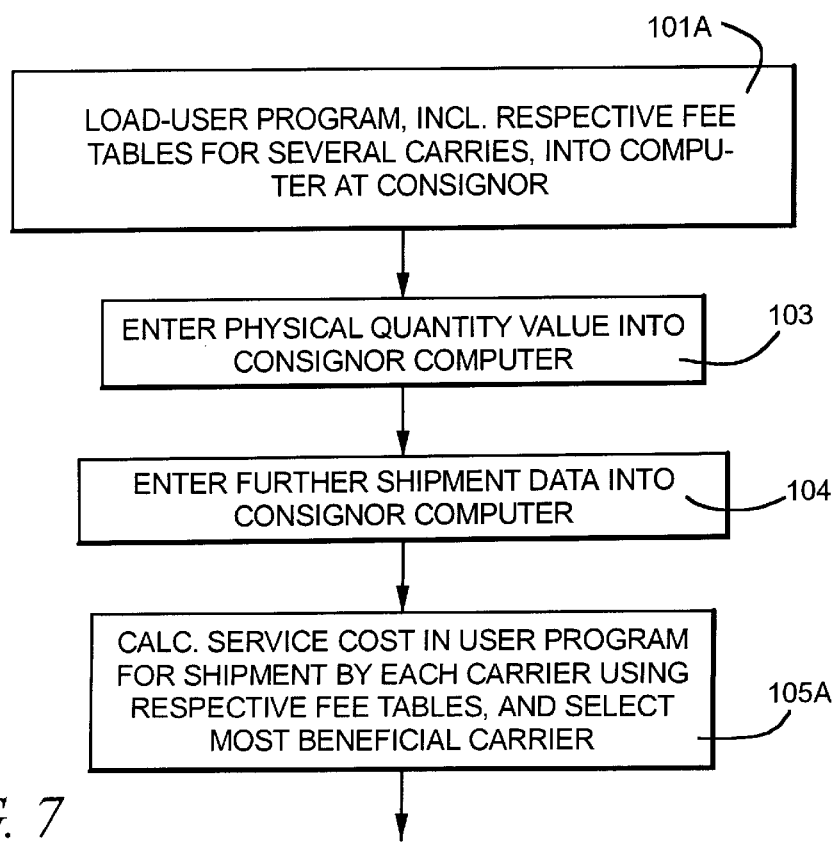
FIG. 7 is a flowchart showing a second variation of the method shown in FIG. 5.

As shown in FIG. 7, step 101 can be modified, as step 101A, so that a number of fee tables, respectively associated with different carriers, are entered into the computer at the consignor. Steps 103 and 104 proceed as described above. In a modified version of step 105, as step 105A, the service cost is calculated in the user program for shipment by each carrier, using the respective fee tables, and from the thus-calculated costs a most beneficial carrier is selected for actually shipping the shipment.

The employment of the inventive method is not limited to use at the location of the consignor. The carriers driver service or pick-up service can employ a modified postage meter machine that uses the inventive method in mobile fashion. In particular, this would be advantageous for a shipping customer with low mail volume.

Although modifications and changes may be suggested by those skilled in the art, it is the intention of the inventor to embody within the patent warranted hereon all changes and modifications as reasonably and properly come within the scope of her contribution to the art.

I claim as my invention:

1. A method for debiting shipping services for a shipment dependent on transport service fee schedules for a carrier performing a shipping service, comprising the steps of:

loading a user program into a computerized device disposed at a consignor including a printer and a telecommunication port, said user program including a service fee table for at least one shipment carrier;

producing a physical quantity value representing at least one physical quantity of a shipment;

entering said physical quantity value into said computerized device;

entering further shipment data into said computerized device, said further shipment data including at least destination data representing a shipment destination and carrier data representing said carrier;

calculating a service cost for transporting said shipment to a destination designated by said destination data and using a carrier designated by said carrier data, in said user program using said service fee table;

supplying a blank identify ticket to said printer and printing a printed identity ticket in a print operation at said printer of said computerized device having shipment parameters thereon for transporting said shipment and including at least a printed representation of said service cost, an identifier for said computerized device, information relating to said print operation, said destination and said carrier;

affixing said printed identity ticket to said shipment;

intermediately storing shipment parameter data representing the shipment parameters on said identity ticket in an intermediate memory in said computerized device;

producing a telecommunication link, via said telecommunication port, between said computerized device and a remote data center;

for each said print operation, transferring said shipment parameter data stored in said intermediate memory to said data center via said telecommunication link;

at said data center, receiving said shipment parameter data and compiling said shipment parameter data and conducting an accounting program exclusively at said data center for producing a monetary settlement for said shipment for each carrier and for each consignor; and communicating said monetary settlement from said data center to each consignor for payment of said service value.

2. A method as claimed in claim 1 wherein the step of producing a physical quantity value comprises weighing said shipment and obtaining a weight value as said physical quantity value.

3. A method as claimed in claim 1 wherein the step of transmitting said shipment parameter data to said data center comprises automatically transmitting said shipment parameter data to said data center after each printing by said printer.

4. A method as claimed in claim 1 comprising the additional step of communicating a duplicate of said monetary settlement from said data center to said shipment carrier.

5. A method as claimed in claim 1 wherein the step of communicating said monetary settlement comprises communicating said monetary settlement to a financial institution identified by said consignor.

6. A method as claimed in claim 1 wherein the step of producing said physical quantity value comprises manually determining said physical quantity value and manually entering said physical quantity value into said computerized device via an input unit of said computerized device.

7. A method as claimed in claim 1 wherein the step of producing said physical quantity value comprises manually weighing said shipment to obtain a weight value and manually entering said weight value together with further shipment parameters into said computerized device via an input unit of said computerized device.

8. A method as claimed in claim 1 comprising the additional step of intermediately storing said information relating to said print operation for a plurality of printings in said computerized device.

9. A method as claimed in claim 1 comprising storing respective service fee tables for a plurality of carriers in said computerized device and determining, during execution of said user program, a most beneficial carrier for a current shipment from said shipment parameters and said plurality of service fee tables.

10. A method as claimed in claim 1 comprising the additional step of requiring entry of an authorized password before enabling execution of said user program in said computerized device.

11. A method as claimed in claim 1 wherein the step of communicating said monetary settlement comprises communicating said monetary settlement from said data center at least to said consignor immediately after obtaining each monetary settlement at said data center.

12. A method as claimed in claim 1 wherein the step of communicating said monetary settlement comprises accumulating a plurality of monetary settlements to obtain monetary settlement set, and transmitting said monetary settlement set from said data center at least to said consignor.

13. A method as claimed in claim 1 comprising the additional steps of providing a memory in said computerized device, said memory being accessible during execution of said user program, and storing in said memory said fee schedule table, recipient data, address data, a form for said identity ticket, and a consignor logo, for use during execution of said user program.

14. A method as claimed in claim 13 comprising storing at least a frame for said identity ticket as a part of said identity ticket form.

15. A method as claimed in claim 13 comprising the additional steps of, during execution of said user program, reading said recipient data from said memory and printing said recipient data on said identity ticket by said printer in machine-readable form.

16. A method as claimed in claim 1 comprising the additional steps of intermediately storing a plurality of data sets of shipment parameter data respectively produced for a plurality of printings by said printer, as intermediately stored data, and wherein the step of transmitting said shipment parameter data to said data center comprises transmitting all of said intermediately stored data to said data center at a selected time.

17. A method as claimed in claim 16 comprising transmitting all of said intermediately stored data to said data center after a predetermined time span has elapsed.

18. A method as claimed in claim 16 comprising transmitting all of said intermediately stored data to said data center at a predetermined point in time.

19. A method as claimed in claim 16 comprising transmitting all of said intermediately stored data to said data center after a predetermined number of printings.

20. A method as claimed in claim 16 comprising transmitting all of said intermediately stored data to said data center after a total summed value quantity of said plurality of service values is reached.

* * * * *